(12) United States Patent
Li

(10) Patent No.: US 12,177,859 B2
(45) Date of Patent: Dec. 24, 2024

(54) METHOD AND DEVICE FOR INDICATING TRANSMISSION

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 450 days.

(21) Appl. No.: 17/472,078

(22) Filed: Sep. 10, 2021

(65) Prior Publication Data
US 2021/0410125 A1 Dec. 30, 2021

Related U.S. Application Data

(63) Continuation of application No. PCT/CN2019/077682, filed on Mar. 11, 2019.

(51) Int. Cl.
H04W 72/23 (2023.01)
H04W 72/0446 (2023.01)

(52) U.S. Cl.
CPC ....... *H04W 72/23* (2023.01); *H04W 72/0446* (2013.01)

(58) Field of Classification Search
None
See application file for complete search history.

(56) References Cited

U.S. PATENT DOCUMENTS 9,572,149 B1 * 2/2017 Zhou ........................ H04L 5/00
2016/0373337 A1   12/2016 DeCusatis et al.
2018/0132229 A1 * 5/2018 Li ............................ H04L 5/0053
2018/0206267 A1 * 7/2018 Islam .................... H04L 5/1469
2018/0219649 A1 * 8/2018 Ying ...................... H04W 76/27
2018/0234959 A1 * 8/2018 Ahn ....................... H04W 72/20
2018/0279327 A1 * 9/2018 Ying .................... H04W 72/0446
2018/0294859 A1 * 10/2018 Niu ........................... H04L 5/00
2018/0317225 A1 * 11/2018 Akkarakaran ........ H04L 5/0044
2018/0343653 A1 * 11/2018 Guo ........................ H04B 7/088
2018/0368117 A1 * 12/2018 Ying ...................... H04L 1/0061
2018/0376496 A1 * 12/2018 Wang .................... H04L 5/0091

(Continued)

FOREIGN PATENT DOCUMENTS

CA    3024596 A1 *  5/2019  ............ H04B 7/06
CN  108199819 A  *  6/2018  ............ H04L 1/0023

(Continued)

OTHER PUBLICATIONS

Japanese Patent Application No. 2021-554374, Office Action dated Oct. 11, 2022; 5 pages.

(Continued)

*Primary Examiner* — Andrew C Oh
(74) *Attorney, Agent, or Firm* — Cozen O'Connor

(57) ABSTRACT

A method and a device for indicating transmission. The method includes: determining to transmit one or more transmission blocks (TBs) in a first number of designated time units, where the first number is an integer greater than 1; generating a first downlink control information (DCI) signaling for indicating to transmit the TBs in the respective designated time units; and transmitting the first DCI signaling to a terminal, so that the terminal transmits the TBs in the respective designated time units based on the first DCI signaling.

18 Claims, 10 Drawing Sheets

(56) References Cited

U.S. PATENT DOCUMENTS

| | | | |
|---|---|---|---|
| 2019/0037561 A1* | 1/2019 | Jung | H04L 1/1812 |
| 2019/0103943 A1* | 4/2019 | Wang | H04L 1/1854 |
| 2019/0115955 A1* | 4/2019 | John Wilson | H04L 5/0055 |
| 2019/0141693 A1* | 5/2019 | Guo | H04W 72/1268 |
| 2019/0150164 A1* | 5/2019 | Nam | H04L 1/1812 370/329 |
| 2019/0253986 A1* | 8/2019 | Jeon | H04L 5/0048 |
| 2019/0254020 A1* | 8/2019 | Nam | H04L 5/0051 |
| 2019/0254045 A1* | 8/2019 | Sadiq | H04W 72/12 |
| 2019/0260445 A1* | 8/2019 | John Wilson | H04B 7/0486 |
| 2019/0260524 A1* | 8/2019 | Nam | H04L 5/0091 |
| 2019/0313342 A1* | 10/2019 | Papasakellariou | H04W 52/146 |
| 2019/0334603 A1* | 10/2019 | Venugopal | H04L 5/0057 |
| 2019/0364438 A1* | 11/2019 | Yang | H04W 16/28 |
| 2020/0178287 A1* | 6/2020 | Kim | H04W 72/23 |
| 2020/0229152 A1* | 7/2020 | Park | H04L 5/0044 |
| 2020/0274670 A1* | 8/2020 | Sun | H04L 27/26 |
| 2020/0288479 A1* | 9/2020 | Xi | H04B 7/088 |
| 2020/0374933 A1* | 11/2020 | Lou | H04W 74/0808 |
| 2020/0389885 A1* | 12/2020 | Tomeba | H04W 72/21 |
| 2021/0084640 A1* | 3/2021 | Kang | H04L 5/0048 |
| 2021/0084663 A1* | 3/2021 | Takeda | H04W 72/0446 |
| 2021/0135808 A1* | 5/2021 | Choi | H04L 5/0048 |
| 2021/0152301 A1* | 5/2021 | Saito | H04L 5/0051 |
| 2021/0204311 A1* | 7/2021 | Takeda | H04W 72/1268 |
| 2021/0274521 A1* | 9/2021 | Yuan | H04L 1/0038 |
| 2021/0314038 A1* | 10/2021 | Matsumura | H04L 25/0202 |
| 2021/0337548 A1* | 10/2021 | Gao | H04W 72/23 |
| 2021/0391912 A1* | 12/2021 | Hakola | H04B 7/0408 |
| 2021/0410170 A1* | 12/2021 | Matsumura | H04L 5/0044 |
| 2022/0052820 A1* | 2/2022 | Ling | H04W 72/23 |

FOREIGN PATENT DOCUMENTS

| | | | | |
|---|---|---|---|---|
| CN | 108418659 A | | 8/2018 | |
| CN | 109792745 A | * | 5/2019 | H04B 7/0408 |
| CN | 110268666 A | * | 9/2019 | H04L 1/00 |
| CN | 110535545 A | * | 12/2019 | H04B 17/345 |
| CN | 110719632 A | * | 1/2020 | H04W 72/046 |
| CN | 110719643 A | * | 1/2020 | H04L 5/001 |
| CN | 111200871 A | * | 5/2020 | H04L 1/1812 |
| CN | 113170446 A | * | 7/2021 | H04B 7/02 |
| CN | 113316950 A | * | 8/2021 | H04L 5/0044 |
| CN | 113330795 A | * | 8/2021 | H04J 4/00 |
| JP | 2020039073 A | * | 3/2020 | |
| JP | 2020072371 A | * | 5/2020 | H04B 7/088 |
| JP | 2020072372 A | * | 5/2020 | H04B 7/022 |
| JP | 2020072373 A | * | 5/2020 | |
| JP | 7370976 B2 | * | 10/2023 | H04L 1/0061 |
| JP | 7403548 B2 | * | 12/2023 | H04J 4/00 |
| RU | 2772489 C1 | * | 5/2022 | H04B 7/0408 |
| WO | WO 2017192889 A1 | | 11/2017 | |
| WO | WO-2019021473 A1 | * | 1/2019 | H04L 1/0006 |
| WO | WO-2019153347 A1 | * | 8/2019 | H04B 7/0695 |
| WO | WO-2019154066 A1 | * | 8/2019 | H04B 17/373 |
| WO | WO-2019156085 A1 | * | 8/2019 | H04B 7/0413 |
| WO | WO-2019183960 A1 | * | 10/2019 | H04B 7/061 |
| WO | WO-2019219162 A1 | * | 11/2019 | H04B 7/0617 |
| WO | WO-2020075233 A1 | * | 4/2020 | H04B 7/024 |

OTHER PUBLICATIONS

Japanese Patent Application No. 2021-554374, English translation of Office Action dated Oct. 11, 2022; 5 pages.
NEC "Time domain resource allocation for mini-slot" 3GPP TSG RAN WG1 Meeting #88, R1-1701981, Feb. 2017, 4 pages.
European Patent Application No. 19919144.6, partial supplementary Search and Opinion dated Feb. 23, 2022, 12 pages.
Samsung "Scheduling of multiple transport blocks for MTC" 3GPP Draft; R1-1902211; Feb. 2019; 6 pages.
ZTE "The PDCCH monitoring and TTI modeling" 3GPP Draft; R2-1708139; Aug. 2017, 6 pages.
Russian Patent Application No. 2021128877, Office Action dated Mar. 22, 2022, 7 pages.
Russian Patent Application No. 2021128877, English translation of Office Action dated Mar. 22, 2022, 6 pages.
Indian Patent Application No. 202147045283, Office Action dated May 31, 2022; 6 pages.
European Patent Application No. 19919144.6, extended Search and Opinion dated Jun. 15, 2022, 12 pages.
NTT Docomo, Inc "Enhancements on multi-TRP/panel transmission"; 3GPP TSG RAN WG1 #96; R1-1902812; Feb. 2019; 25 pages.
PCT/CN2019/077682 English translation of International Search Report dated Jul. 23, 2019, 2 pages.
Korean Patent Application No. 10-2021-7032551 Office Action dated Mar. 14, 2024, 8 pages.
Korean Patent Application No. 10-2021-7032551 English translation of Office Action dated Mar. 14, 2024, 7 pages.
3rd Generation Partnership Project; Technical Specification Group Radio Access Network, NR "Physical layer procedures for data" 3GPP TS 38.214 V15.4.0, Release 15, Dec. 2018, 102 pages.
LG Electronics, "PUSCH enhancements for NR URLLC" 3GPP TSG RAN WG1 Ad-Hoc Meeting 1901, R1-1900593, Jan. 2019, 7 pages.
3rd Generation Partnership Project; Technical Specification Group Radio Access Network, "Multiplexing and channel coding" 3GPP TS 38.212 V15.4.0, Release 15, Dec. 2018, 100 pages.
Huawei, HiSilicon, "PUSCH enhancements for URLLC" 3GPP TSG RAN WG1 Ad-Hoc Meeting 1901, R1-1900046, Jan. 2019, 11 pages.
Huawei, HiSilicon, "Summary of AI: 7.2.8.2 Enhancements on Multi-TRP/Panel Transmission of Offline Discussion" 3GPP TSG RAN WG1 Meeting #96, R1-190abcd, Feb. 2019, 59 pages.

* cited by examiner

METHOD AND DEVICE FOR INDICATING TRANSMISSION

CROSS-REFERENCE TO RELATED APPLICATION

This application is a continuation application of International Application No. PCT/CN2019/077682, filed on Mar. 11, 2019, the entire contents of which are incorporated herein by reference.

TECHNICAL FIELD

The disclosure relates to the field of communication technologies, and more particularly, to a method and a device for indicating transmission.

BACKGROUND

A high-frequency channel in a new generation communication system attenuates quickly. Therefore, it is necessary to send and receive data based on beams to ensure good coverage. In related art, when supporting a URLLC (Ultra Reliable & Low Latency Communication) service, it is necessary to quickly and reliably transmit/receive TBs (Transmission Blocks) of URLLC to ensure low latency and high reliability.

SUMMARY

According to a first aspect of embodiments of the disclosure, a method for indicating transmission is provided. The method is applicable to a base station.

In one embodiment, the method includes determining to transmit/receive two or more transmission blocks (TBs) in a first number of designated time units, where the first number is an integer greater than 1.

In another embodiment, the method includes generating a first downlink control information (DCI) signaling for indicating that the two or more TBs are transmitted/received in the designated time units and further for indicating two or more pieces of beam indication information for the two or more TBs.

In another embodiment, the method includes transmitting the first DCI signaling to a terminal.

According to a second aspect of embodiments of the disclosure, a method for indicating transmission is provided.

In one embodiment, the method includes receiving a first downlink control information (DCI) signaling from a base station, where the first DCI signaling is configured to indicate that two or more transmission blocks (TBs) are transmitted/received in a first number of designated time units and further indicate two or more pieces of beam indication information for the two or more TBs, and the first number is an integer greater than 1.

In another embodiment, the method includes receiving/transmitting the TBs in the designated time units based on the first DCI signaling.

According to a third aspect of embodiments of the disclosure, a device for indicating transmission is provided. The device is applicable to a base station.

The device includes a processor.

The device includes a memory for storing instructions executable by the processor.

The processor is configured to perform the following.

It is determined to transmit/receive two or more transmission blocks (TBs) in a first number of designated time units, where the first number is an integer greater than 1.

A first downlink control information (DCI) signaling for indicating that the two or more TBs are transmitted/received in the designated time units and further for indicating two or more pieces of beam indication information for the two or more TBs.

The first DCI signaling is transmitted to a terminal.

According to a fourth aspect of embodiments of the disclosure, a device for indicating transmission is provided. The device is applicable to a terminal.

The device includes a processor.

The device includes a memory for storing instructions executable by the processor.

The processor is configured to perform the following.

A first downlink control information (DCI) signaling is received from a base station, where the first DCI signaling is configured to indicate that one or more transmission blocks (TBs) are transmitted/received in a first number of designated time units, and the first number is an integer greater than 1.

The TBs are received/transmitted in the designated time units based on the first DCI signaling.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used herein in the disclosure are only for the purpose of describing specific embodiments, but should not be construed to limit the disclosure. As used in the description of the disclosure and the appended claims, "a", "said" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as "first", "second" and "third" are used in the disclosure herein for describing various information, the information should not be limited by these terms. These terms are only used for distinguishing the same type of information from each other. For example, without departing from the scope of the disclosure, indication information may also be referred to as second information, and similarly, second information may also be called as indication information. Depending on the context, the term "if" may be understood to mean "when" or "upon" or "in response to the determination of".

Figure 1:
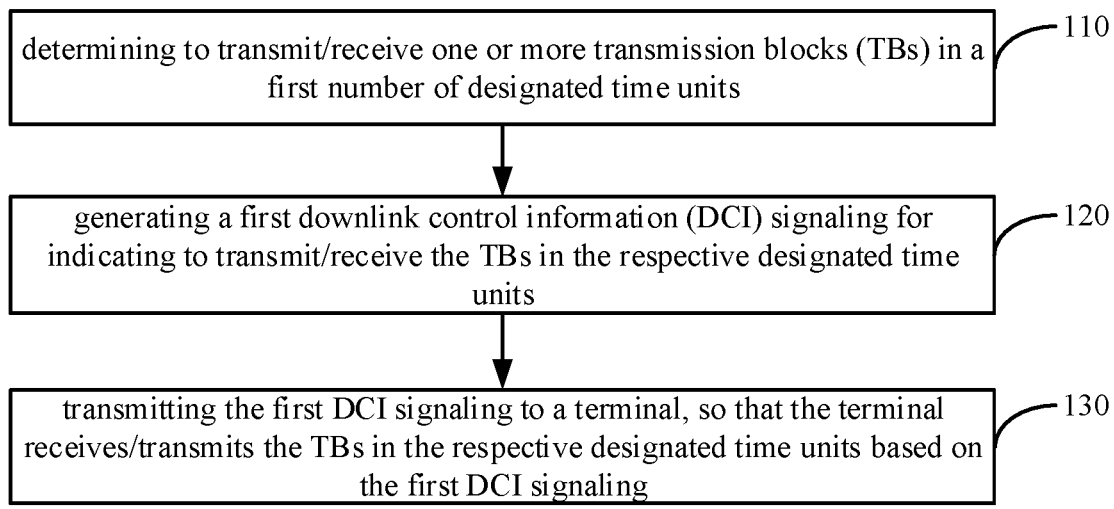
FIG. 1 is a flow chart illustrating a method for indicating transmission, according to an exemplary embodiment.
Figure 2:
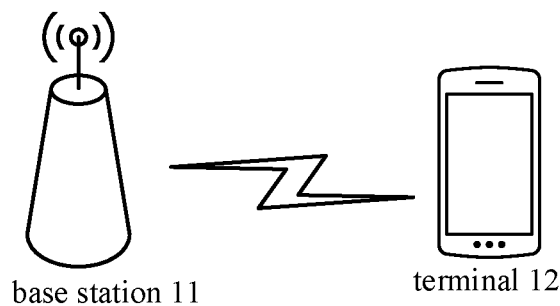
FIG. 2 is a schematic diagram illustrating a scenario of a method for indicating transmission, according to an exemplary embodiment.

FIG. 1 is a flow chart illustrating a method for indicating transmission, according to an exemplary embodiment. FIG. 2 is a schematic diagram illustrating a scenario of a method for indicating transmission, according to an exemplary embodiment. The method for indicating transmission may be applicable to a base station. As illustrated in FIG. 1, the method for indicating transmission may include actions in the following blocks 110-130.

In block 110, it is determined to transmit/receive one or more transmission blocks (TBs) in a first number of designated time units. The first number is an integer greater than 1.

In some embodiments of the disclosure, the base station may schedule the terminal to receive a TB or schedule the terminal to transmit a TB. Therefore, the term "transmitting/receiving a TB" in the disclosure may include receiving a TB or transmitting a TB. In detail, if it is downlink, the terminal receives a TB; and if it is uplink, the terminal transmits a TB. The term "transmitting/receiving a TB" in all subsequent embodiments is the same as this interpretation, which may not be repeated.

For the same TB, if it is to be repeatedly transmitted/received N times, time domain resources and beams used are different and other resources used are the same. At this time, it is possible to schedule to repeatedly transmit/receive this TB by using different beams at different times. The other resources may include frequency domain resources, modulation and coding modes, HARQ (Hybrid Automatic Repeat reQuest) process numbers, and the like.

For different TBs, multiple designated time units for transmitting/receiving the TBs may also be scheduled by one DCI, in which different time domain resources and beams are used and different TBs use different HARQ process numbers.

For example, the first number is K and it is determined to transmit/receive one TB in K designated time units. That is, the TB needs to be transmitted/received in each designated time unit of the K designated time units.

For another example, the first number is K and two TBs, i.e. the first TB and the second TB, are transmitted/received in K designated time units. That is, the first TB may be transmitted/received in some of the K designated time units and the second TB may be transmitted/received in the remaining of the K designated time units.

For another example, the first number is K and K TBs are transmitted/received in K designated time units. That is, one TB may be transmitted/received in each of the K designated time units and the TB transmitted/received in each designated time unit may be different.

In some embodiments, the designated time unit in block 110 may be a designated mini-slot. The process of indicating transmission may be detail with reference to embodiments in FIG. 3.

In some embodiments, the designated time unit in block 110 may be a designated slot. The process of indicating transmission may be detail with reference to embodiments in FIG. 4.

In block 120, a first downlink control information (DCI) is generated. The DCI signaling is configured to indicate that the one or more TBs are transmitted/received in the designated time units.

In some embodiments of the disclosure, the base station may instruct the terminal to receive/transmit the one or more TBs in the designated time units through the DCI signaling.

In block 130, the first DCI signaling is transmitted to the terminal, so that the terminal receives/transmits the one or more TBs in the designated time units based on the first DCI signaling.

In an example scenario, as illustrated in FIG. 2, there are a base station 11 and a terminal 12. When the base station 11 determines to transmit/receive one or more TBs in the first number of designated time units, it may generate the first DCI signaling. The first DCI signaling is configured to indicate that the one or more TBs are transmitted/received in the designated time units. The first DCI signaling is transmitted to the terminal 12, so that the terminal 12 may receive/transmit the one or more TBs in the designated time units based on the first DCI signaling after receiving the first DCI signaling.

In the disclosure, the base station 11 may be a device deployed in an access network to provide the terminal 12 with a wireless communication function. The base station 11 may include various forms of macro base stations, micro base stations, relay stations, access points, and the like. In systems using different wireless access technologies, names of devices with base station functions may be different. For example, in a 5G (5th Generation Mobile Communication Technology) NR (New Radio) system, it may be called gNodeB or gNB. As communication technologies evolve, the name "base station" may change. For ease of description, in the embodiments of the disclosure, the above-mentioned device that provides the terminal 12 with the wireless communication function may be collectively referred to as the base station.

The number of terminals 12 is usually multiple, and one or more terminals 12 may be distributed in a cell managed by each base station 11. The terminals 12 may include various handheld devices, vehicle-mounted devices, wearable devices, computing devices, with wireless communication functions, or other processing devices coupled to wireless modems, as well as various forms of user equipment (UE), mobile stations (MS), terminal devices, etc. For ease of description, in the embodiments of the disclosure, the devices mentioned above may be collectively referred to as terminals.

It may be seen from the above embodiments that when it is determined to transmit/receive the one or more TBs in the first number of designated time units, the first DCI signaling may be generated and the first DCI signaling is configured to indicate that the one or more TBs are transmitted/received in the designated time units. The first DCI signaling is transmitted to the terminal, so that the terminal may receive/transmit the one or more TBs in the designated time units based on the first DCI signaling after receiving the first DCI signaling, thereby realizing that different beam directions are indicated through DCI for transmitting/receiving the one or more TBs in different time units and improving a robustness of communication.

Figure 3:
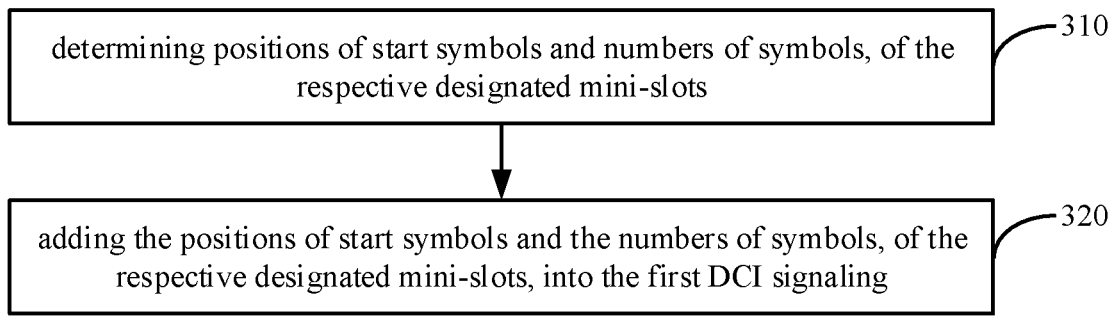
FIG. 3 is a flow chart illustrating another method for indicating transmission, according to an exemplary embodiment.

FIG. 3 is a flow chart illustrating another method for indicating transmission, according to an exemplary embodiment. The method for indicating transmission may be applicable to the base station and based on the method in FIG. 1. The first number of designated time units may be the first number of designated mini-slots. When the action in block 120 is performed, as illustrated in FIG. 3, actions in the following blocks 310-320 may be included.

In block 310, a position of start symbol and a number of symbols of each designated mini-slot, are determined.

In some embodiments of the disclosure, a designated time unit may be a designated mini-slot. Symbols included in each designated mini-slot may be the same or different. The first DCI signaling needs to clearly specify the position of start symbol and the number of symbols in each mini-slot.

In some embodiments, a number of slots occupied by the designated mini-slots in block 310 is a second number and the second number is an integer greater than 0. The second number is less than or equal to the first number. All symbols of one designated mini-slot are within one slot and cannot be allocated in different slots.

For example, the first number is K and the second number is N, where K is greater than or equal to N. If K is equal to N, there may be one mini-slot in one slot. If K is greater than N, some slots each may include one mini-slot and some slots each may include multiple mini-slots.

In some embodiments, the designated mini-slots in block 310 may include adjacent mini-slots and/or non-adjacent mini-slots.

For example, the $i^{th}$ designated mini-slot is adjacent to the $(i+1)^{th}$ designated mini-slot, that is, the last symbol of the $i^{th}$ mini-slot is adjacent to the start symbol of the $(i+1)$th mini-slot; or the $i^{th}$ designated mini-slot is not adjacent to the $(i+1)$th designated mini-slot, that is, there is a gap symbol between the last symbol of the $i^{th}$ mini-slot and the start symbol of the $(i+1)$th mini-slot; or the $i^{th}$ designated mini-slot is adjacent to the $(i+1)$th designated mini-slot when i takes some values, and the $i^{th}$ designated mini-slot is not adjacent to the $(i+1)$th designated mini-slot when i takes other values.

In block 320, the position of start symbol and the number of symbols of each designated mini-slot, are added into the first DCI signaling.

It may be seen from the above embodiments that the position of start symbol and the number of symbols of each designated mini-slot may be determined. The position of start symbols and the number of symbols of each designated mini-slot may be added into the first DCI signaling. Therefore, it is convenient for the terminal to receive/transmit the one or more TBs based on the positions of start symbols and the numbers of symbols of the designated mini-slots in the first DCI signaling, thereby improving the accuracy of transmission indication.

Figure 4:
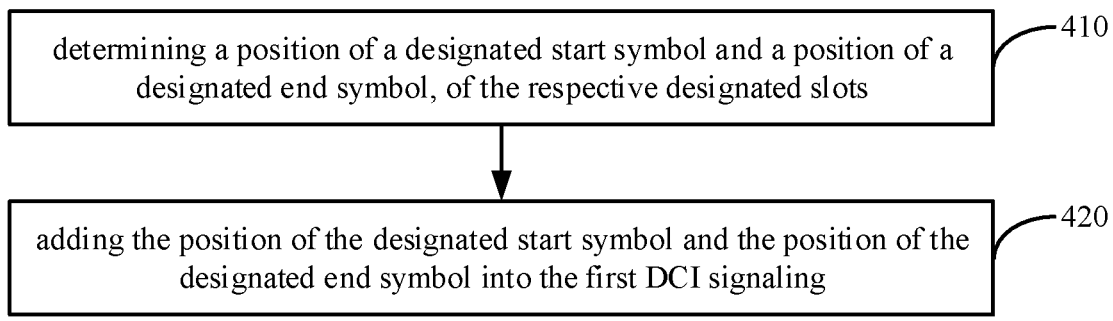
FIG. 4 is a flow chart illustrating another method for indicating transmission, according to an exemplary embodiment.

FIG. 4 is a flow chart illustrating another method for indicating transmission, according to an exemplary embodiment. The method for indicating transmission may be applicable to the base station and based on the method in FIG. 1. The first number of designated time units may be the first number of designated slots. When the action in block 120 is performed, as illustrated in FIG. 4, actions in the following blocks 410-420 may be included.

In block 410, a position of a designated start symbol and a position of a designated end symbol of each designated slot are determined.

In some embodiments of the disclosure, a designated time unit may be a designated slot. The position of the designated start symbol and the position of the designated end symbol of the transmission of each designated slot need to be clearly indicated by the first DCI signaling.

In some embodiments, the position of the designated start symbol in block 410 is a position of the first designated slot of the designated slots, and positions of start symbols of other designated slots are the first symbols of other designated slots; or the position of the designated start symbol is a position of each designated slot of the designated slots.

In some embodiments, the position of the designated end symbol in block 410 is a position of the last designated slot of the designated slots, and positions of end symbols of other designated slots are the last symbols of other designated slots; or the position of the designated end symbol is a position of each designated slot of the designated slots.

In some embodiments, the designated slots of the first number of designated slots may be adjacent slots.

In block 420, the position of the designated start symbol and the position of the designated end symbol are added into the first DCI signaling.

It may be seen from the above embodiments the position of the designated start symbol and the position of the designated end symbol of the designated slot may be determined. The position of the designated start symbol and the position of the designated end symbol may be added into the first DCI signaling. Therefore, it is convenient for the terminal to receive/transmit the one or more TBs based on the position of the designated start symbol and the position of the designated end symbol in the first DCI signaling, thereby improving the efficiency of transmitting/receiving the TBs.

Figure 5:
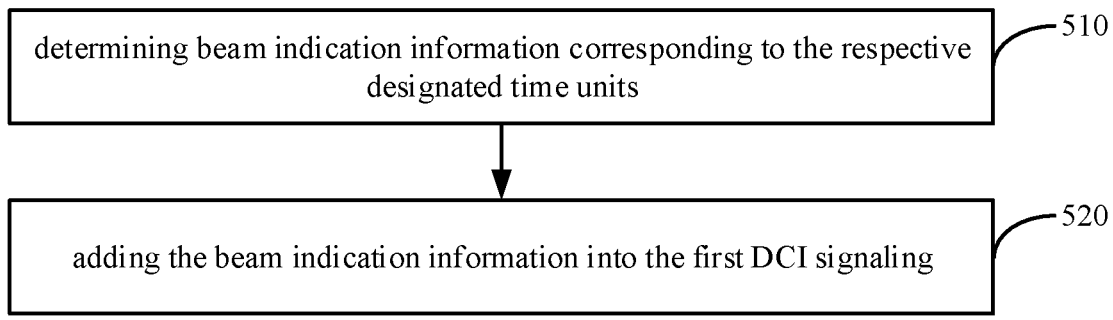
FIG. 5 is a flow chart illustrating another method for indicating transmission, according to an exemplary embodiment.

FIG. 5 is a flow chart illustrating another method for indicating transmission, according to an exemplary embodiment. The method for indicating transmission may be applicable to the base station and based on the method in FIG. 1. When the action in block 120 is performed, as illustrated in FIG. 5, actions in the following blocks 510-520 may be included.

In block 510, beam indication information corresponding to each designated time unit is determined.

In some embodiments of the disclosure, since the base station needs to inform, by the beam indication information, the terminal the beam for receiving/transmitting the TB, the first DCI signaling needs to clearly indicate the beam indication information corresponding to the each designated time unit. A designated time unit may be a designated mini-slot or a designated slot.

As for the correspondence between the beam indication information and the each designated time unit, it may be determined based on the number of pieces of beam indication information to be allocated and the number of the designated time units, which may include but be not limited to the following implementations.

Manner 1, a number of pieces of beam indication information to be allocated is a third number, the number of the designated time units is the first number, and the third number is equal to the first number.

In this manner, when the action in block 510 is executed, it may include the following.

(1-1) the pieces of beam indication information are allocated to the designated time units, respectively. Different pieces of beam indication information are allocated to different designated time units.

For example, the first number is K and the third number is M, where K is equal to M. A time unit corresponds to a piece of beam indication information.

Manner 2: a number of pieces of beam indication information to be allocated is a fourth number, the number of the designated time units is the first number, the fourth number is less than the first number, and the fourth number is an integer greater than 0.

In this manner, when the action in block 510 is executed, it may include the following.

(2-1) For the designated time units, the pieces of beam indication information are allocated to the fourth number of latter designated time units, respectively, and one piece of default beam indication information is allocated to each of other designated time units.

For example, the first number is K and the fourth number is P, where K is greater than P. When the difference between K and P is j, the beam indication information of the first j designated time units may be the default beam indication information, and the following P designated time units correspond to P pieces of beam indication information in sequence. Since the time intervals between the positions of the start symbols of the first few designated time units and the position of the end symbol of the first DCI signaling are small, and the terminal may not obtain the correct beam indication information by decoding, and may not adjust the receiving beam direction to the correct transmission beam within this time period, so the default beam indication information may be used as the beam indication information of the first few designated time units.

Manner 3: a number of pieces of beam indication information to be allocated is a fifth number, the number of the designated time units is the first number, the fifth number is less than the first number, and the fifth number is an integer greater than 0.

In this manner, when the action in block 510 is executed, it may include the following.

(3-1) The first number of designated time units are divided into the fifth number of time unit groups.

(3-2) A time interval between each time unit in the each time unit group and the first DCI signaling is calculated, default beam indication information is allocated to a time unit whose time interval is less than a preset threshold; and one of the fifth number of pieces of beam indication information is allocated a time unit whose time interval is greater than or equal to the threshold, in which different time unit groups are allocated with different pieces of beam indication information in the fifth number of pieces of beam indication information, and the time unit group may include consecutive time units and/or nonconsecutive time units.

For example, the first number is K and the fifth number is 2. The beam indication information to be allocated includes the first beam indication information and the second beam indication information. K designated time units may be divided into two time unit groups. In the two time unit groups, the time units whose time intervals are less than the preset threshold are allocated with the default beam indication information. The time units in the first time unit group whose time intervals are greater than or equal to the threshold are allocated with the first beam indication information, and the time units in the second time unit group whose time intervals are greater than or equal to the threshold are allocated with the second beam indication information.

For another example, the first number is K and is an even number, and the fifth number is 2. When dividing K designated time units into the two time unit groups, the first K/2 designated time units may be included in the first time unit group, and the following K/2 designated time units may be included in the second time unit group. Alternatively, odd-numbered designated time units such as 1, 3, 5, 7 . . . may form the first time unit group, and even-numbered designated time units such as 2, 4, 6, 8 . . . may form the second time unit group, that is, the first time unit group is an odd group, and the second time unit group is an even group.

For another example, the first number is K and the fifth number is 1. The beam indication information to be allocated includes the first beam indication information. At this time, the time interval between each designated time unit and the first DCI signaling is calculated. The time unit with the time interval less than the preset threshold is allocated with default beam indication information. The time unit with the time interval is greater than or equal to the threshold is allocated with the first beam indication information.

Manner 4: a number of pieces of beam indication information to be allocated is a sixth number, the number of the designated time units is the first number, the sixth number is less than the first number, and the sixth number is an integer greater than 0.

In this manner, when the action in block 510 is executed, it may include the following.

(4-1) A time interval between each designated time unit and the first DCI signaling is calculated, and default beam indication information is allocated to a time unit whose time interval is less than a preset threshold.

(4-2) Time units whose time intervals are greater than or equal to the threshold are divided into the sixth number of time unit groups, and one of the sixth number of pieces of beam indication information is allocated to each of the sixth number of time unit groups, in which different time unit groups are allocated with different pieces of beam indication information in the sixth number of pieces of beam indication information, and the time unit group may include consecutive time units and/or nonconsecutive time units.

For example, the first number is K, the fifth number is 2, and the beam indication information to be allocated includes the first beam indication information and the second beam indication information. The time units with the time intervals less than the preset threshold are allocated with the default beam indication information. The time units with the time intervals greater than or equal to the threshold are divided into a first time unit group and a second time unit group. The first beam indication information is allocated to the time units in the first time unit group. The second beam indication information is allocated to the time units in the second time unit group.

The difference between Manner 3 and Manner 4 is that, Manner 3 is to group first, and then to allocate the default beam indication information, and Manner 4 is to allocate the default beam indication information first, and then to group.

In some embodiments, the beam indication information to be allocated in Manner 1, Manner 2, Manner 3 and Manner 4 may include a transmission configuration indication (TCI) state for indicating beam information used when the terminal receives data; and/or spatial relation info for indicating beam information used when the terminal transmits data.

In some embodiments, the default beam indication information in (2-1), (3-2) and (4-1) may include a default TCI state and/or default spatial relation info.

In some embodiments, the default TCI state is the same as a TCI state used when receiving the first DCI signaling; or the default TCI state is the same as a TCI state used when receiving a control-resource set (CORESET) with a smallest index, and the CORESET and the first DCI signaling are from the same antenna panel.

In some embodiments, the default spatial relation info is the same as spatial relation info used when transmitting a latest physical uplink control channel (PUCCH), and an antenna panel used when transmitting the PUCCH is the same as an antenna panel used when transmitting uplink data.

In block 520, the beam indication information is added into the first DCI signaling.

In some embodiments, the first DCI signaling also needs to clearly give the antenna panel identifier corresponding to each designated time unit. Therefore, when the action in block 520 is performed, it may include the following.

(5-1) Antenna panel identifiers corresponding to the designated time units are determined.

(5-2) The beam indication information and the antenna panel identifiers are added into the first DCI signaling.

It may be seen from the above embodiments that the beam indication information and/or antenna panel identifiers corresponding to the designated time units may be determined. The beam indication information and/or antenna panel identifiers may be added into the first DCI signaling. Therefore, it is convenient for the terminal to receive/transmit the TBs based on the beam indication information and/or antenna panel identifiers in the DCI signaling, thereby improving the reliability of the terminal using the beam when receiving/transmitting the TBs.

Figure 6:
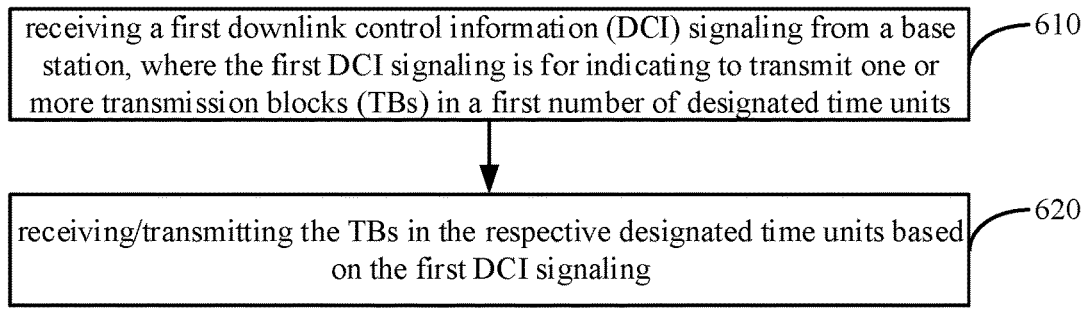
FIG. 6 is a flow chart illustrating a method for indicating transmission, according to an exemplary embodiment.

FIG. 6 is a flow chart illustrating a method for indicating transmission, according to an exemplary embodiment. The method for indicating transmission may be applicable to a terminal. As illustrated in FIG. 6, the method for indicating transmission may include actions in the following blocks 610-620.

In block 610, a first downlink control information (DCI) signaling is received from a base station, where the first DCI signaling is configured to indicate that one or more transmission blocks (TBs) are transmitted/received in a first number of designated time units, and the first number is an integer greater than 1.

In some embodiments of the disclosure, the base station may schedule the terminal to receive one or more TBs or schedule the terminal to send one or more TBs through the DCI signaling.

For example, the first number is K and the first DCI signaling indicates that one TB is transmitted/received in K designated time units. In other words, the terminal needs to receive/transmit the TB in each of the K designated time units.

For another example, the first number is K and the first DCI signaling indicates that two TBs, i.e. the first TB and the second TB, are transmitted/received in K designated time units. In other words, the first TB may be transmitted/received in some of the K designated time units, and the second TB may be transmitted/received in the remaining of the K designated time units.

For another example, the first number is K and the first DCI signaling indicates that K TBs are transmitted/received in K designated time units. In other words, one TB may be transmitted/received in each of the K designated time units, and different TBs may be transmitted/received by different designated time units.

In block 620, the TBs are received/transmitted in the designated time units based on the first DCI signaling.

In some embodiments of the disclosure, since content included in the first DCI signaling may be different, the TBs may be received/transmitted in the designated time units based on different content, including but not limited to the following cases.

Case 1, the designated time unit is a designated mini-slot; and the first DCI signaling includes a position of start symbol and a number of symbols of each designated mini-slot.

In this case, when the action in block 620 is performed, the position of start symbol and the number of symbols of the each designated mini-slot may be determined based on the first DCI signaling. The one or more TBs may be transmitted/received based on the position of start symbol and the number of symbols of the each designated mini-slot.

Case 2, the designated time unit is a designated slot; and the first DCI signaling includes a position of a designated start symbol and a position of a designated end symbol of the each designated slot.

In this case, when the action in block 620 is performed, the position of the designated start symbol and the position of the designated end symbol for transmitting/receiving the one or more TBs, of the each designated slot, may be determined based on the first DCI signaling. The one or more TBs may be transmitted/received based on the position of the designated start symbol and the position of the designated end symbol.

In some embodiments, the position of the designated start symbol is a position of the first designated slot of the designated slots, and positions of start symbols of other designated slots are the first symbols of other designated slots; or the position of the designated start symbol is a position of each designated slot of the designated slots.

In some embodiments, the position of the designated end symbol is a position of the last designated slot of the designated slots, and positions of end symbols of other designated slots are the last symbols of other designated slots; or the position of the designated end symbol is a position of each designated slot of the designated slots.

Case 3, the first DCI signaling includes beam indication information corresponding to the designated time units.

In this case, when the action in block 620 is performed, the beam indication information corresponding to each of the designated time units may be determined based on the first DCI signaling. The one or more TBs may be transmitted/received based on the beam indication information.

Case 4, the first DCI signaling includes beam indication information and an antenna panel identifier, corresponding to each of the designated time units.

In this case, when the action in block 620 is performed, the beam indication information and antenna panel identifier, corresponding to each of the designated time units, may be determined based on the first DCI signaling. The one or more TBs may be transmitted/received based on the beam indication information and antenna panel identifier.

In some embodiments, the beam indication information in case 3 and case 4 includes a transmission configuration indication (TCI) state for indicating beam information used when the terminal receives data; and/or spatial relation info for indicating beam information used when the terminal transmits data.

It may be seen from the above embodiments that the first DCI signaling from the base station is received, and the first DCI signaling is configured to indicate that one or more TBs are transmitted/received in the first number of designated time units. The one or more TBs are received/transmitted in the designated time units based on the first DCI signaling, thereby realizing that different beam directions are indicated through one DCI for transmitting/receiving the one or more TBs in different time units and improving a robustness of communication.

Corresponding to the foregoing embodiments of the methods for indicating transmission, the disclosure also provides embodiments of apparatuses for indicating transmission.

Figure 7:
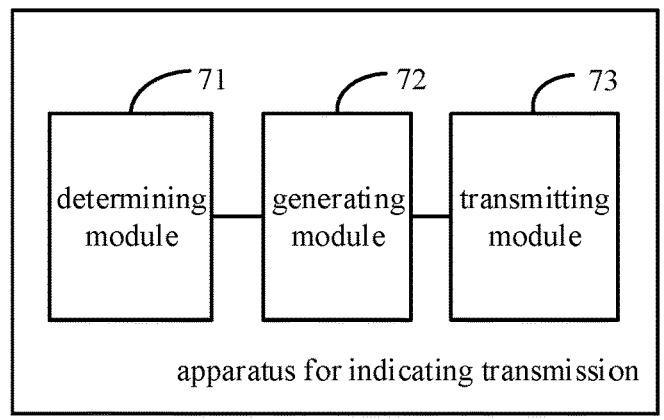
FIG. 7 is a block diagram illustrating an apparatus for indicating transmission, according to an exemplary embodiment.

FIG. 7 is a block diagram illustrating an apparatus for indicating transmission, according to an exemplary embodiment. The apparatus for indicating transmission is applicable to a base station. The apparatus for indicating transmission is configured to perform the method for indicating transmission in FIG. 1. As illustrated in FIG. 7, the apparatus for indicating transmission includes a determining module 71, a generating module 72 and a transmitting module 73.

The determining module 71 is configured to determine to transmit/receive one or more transmission blocks (TBs) in a first number of designated time units, where the first number is an integer greater than 1.

The generating module 72 is configured to generate a first downlink control information (DCI) signaling for indicating that the one or more TBs are transmitted/received in the designated time units.

The transmitting module 73 is configured to transmit the first DCI signaling to a terminal, so that the terminal receives/transmits the one or more TBs in the designated time units based on the first DCI signaling.

It may be seen from the above embodiments that when it is determined to transmit/receive one or more TBs in the first number of designated time units, the first DCI signaling may be generated, and the first DCI signaling is configured to indicate that the TBs are transmitted/received in the designated time units. The first DCI signaling is transmitted to the terminal, so that the terminal may receive/transmit the TBs in the designated time units based on the first DCI signaling after receiving the first DCI signaling, thereby realizing that different beam directions are indicated through DCI for transmitting/receiving the TBs in different time units and improving a robustness of communication.

Figure 8:
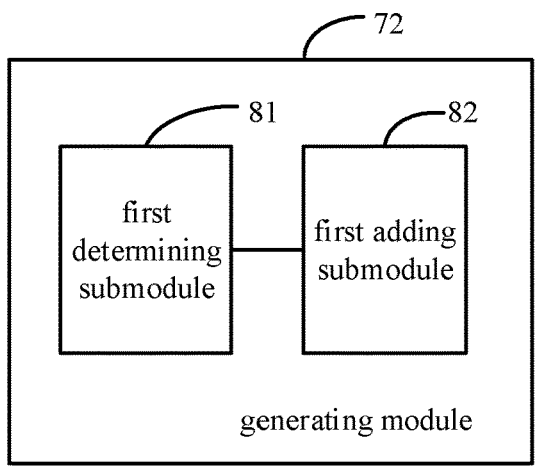
FIG. 8 is a block diagram illustrating another apparatus for indicating transmission, according to an exemplary embodiment.

In some embodiments, based on the apparatus in FIG. 7, as illustrated in FIG. 8, the designated time unit is a designated mini-slot. The generating module 72 includes a first determining submodule 81 and a first adding submodule 82.

The first determining submodule 81 is configured to determine a position of start symbol and a number of symbols of each designated mini-slot.

The first adding submodule 82 is configured to add the position of start symbol and the number of symbols of each designated mini-slot into the first DCI signaling.

In some embodiments, based on the apparatus in FIG. 8, a number of slots occupied by the designated mini-slots is a second number, the second number is less than or equal to the first number, the second number is an integer greater than 0, and all symbols of one designated mini-slot are within one slot and cannot be allocated to different slots.

In some embodiments, based on the apparatus in FIG. 8, the designated mini-slots include adjacent mini-slots and/or non-adjacent mini-slots.

It may be seen from the above embodiments that the positions of start symbols and the numbers of symbols, of the designated mini-slots, may be determined. The positions of start symbols and the numbers of symbols, of the designated mini-slots, may be added into the first DCI signaling. Therefore, it is convenient for the terminal to receive/transmit the TBs based on the positions of start symbols and the numbers of symbols, of the designated mini-slots, in the first DCI signaling, thereby improving the accuracy of transmission indication.

Figure 9:
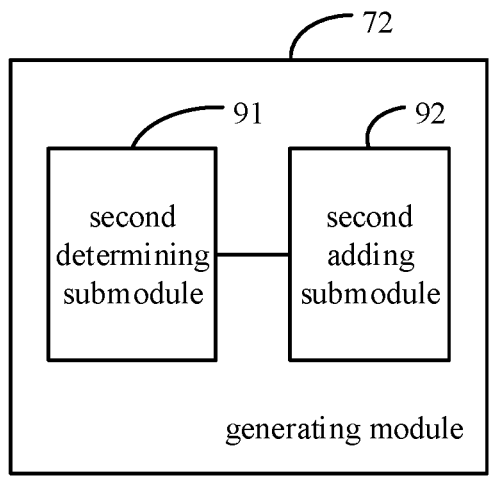
FIG. 9 is a block diagram illustrating another apparatus for indicating transmission, according to an exemplary embodiment.

In some embodiments, based on the apparatus in FIG. 7, as illustrated in FIG. 9, the designated time unit is a designated slot. The generating module 72 includes a second determining submodule 91 and a second adding submodule 92.

The second determining submodule 91 is configured to determine a position of a designated start symbol and a position of a designated end symbol, of each designated slot.

The second adding submodule 92 is configured to add the position of the designated start symbol and the position of the designated end symbol into the first DCI signaling.

In some embodiments, based on the apparatus in FIG. 9, the position of the designated start symbol is a position of the first designated slot of the designated slots, and positions of start symbols of other designated slots are the first symbols of other designated slots; or the position of the designated start symbol is a position of each designated slot of the designated slots.

In some embodiments, based on the apparatus in FIG. 9, the position of the designated end symbol is a position of the last designated slot of the designated slots, and positions of end symbols of other designated slots are the last symbols of other designated slots; or the position of the designated end symbol is a position of each designated slot of the designated slots.

In some embodiments, based on the apparatus in FIG. 9, the designated slots are adjacent slots.

It may be seen from the above embodiments the position of the designated start symbol and the position of the designated end symbol, of the each designated slot, may be determined. The position of the designated start symbol and the position of the designated end symbol may be added into the first DCI signaling. Therefore, it is convenient for the terminal to receive/transmit the TBs based on the position of the designated start symbol and the position of the designated end symbol in the first DCI signaling, thereby improving the efficiency of transmitting/receiving the TBs.

Figure 10:
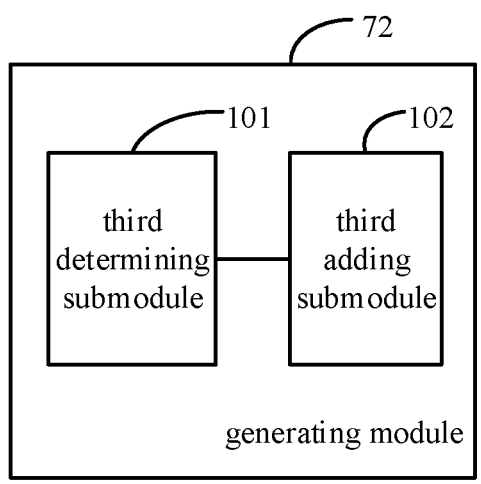
FIG. 10 is a block diagram illustrating another apparatus for indicating transmission, according to an exemplary embodiment.

In some embodiments, based on the apparatus in FIG. 7, as illustrated in FIG. 10, the generating module 72 includes a third determining submodule 101 and a third adding submodule 102.

The third determining submodule 101 is configured to determine beam indication information corresponding to the designated time units.

The third adding submodule 102 is configured to add the beam indication information into the first DCI signaling.

Figure 11:
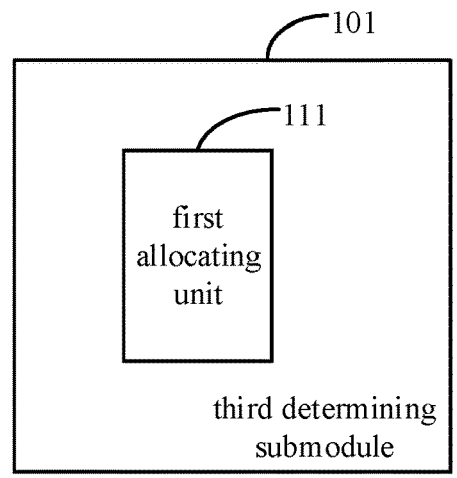
FIG. 11 is a block diagram illustrating another apparatus for indicating transmission, according to an exemplary embodiment.

In some embodiments, based on the apparatus in FIG. 10, as illustrated in FIG. 11, a number of pieces of beam indication information to be allocated is a third number, and the third number is equal to the first number.

The third determining submodule 101 includes a first allocating unit 111.

The first allocating unit 111 is configured to allocate the pieces of beam indication information to the designated time units, respectively, different pieces of beam indication information being allocated to different designated time units.

Figure 12:
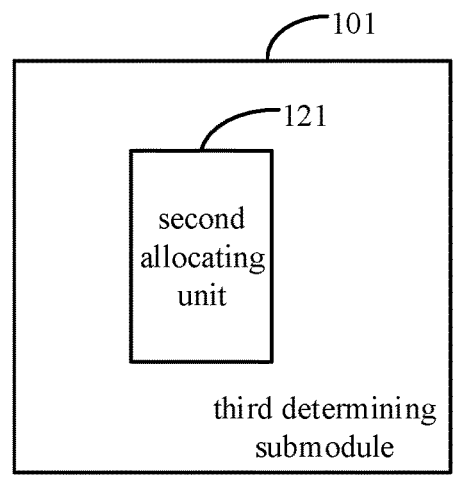
FIG. 12 is a block diagram illustrating another apparatus for indicating transmission, according to an exemplary embodiment.

In some embodiments, based on the apparatus in FIG. 10, as illustrated in FIG. 12, a number of pieces of beam indication information to be allocated is a fourth number, the fourth number is less than the first number, and the fourth number is an integer greater than 0.

The third determining submodule 101 includes a second allocating unit 121.

The second allocating unit 121 is configured to, for the designated time units, allocate the pieces of beam indication information to the fourth number of latter designated time units, respectively, and allocate one piece of default beam indication information to each of other designated time units.

Figure 13:
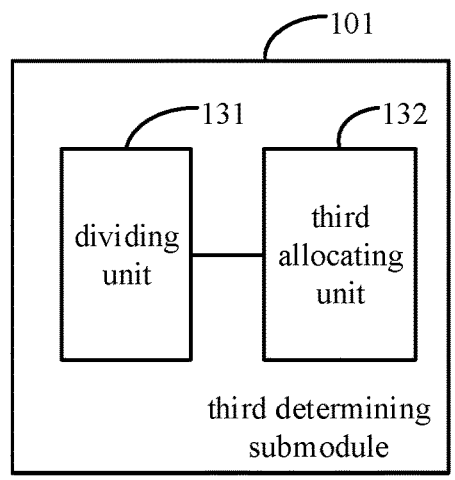
FIG. 13 is a block diagram illustrating another apparatus for indicating transmission, according to an exemplary embodiment.

In some embodiments, based on the apparatus in FIG. 10, as illustrated in FIG. 13, a number of pieces of beam indication information to be allocated is a fifth number, the fifth number is less than the first number, and the fifth number is an integer greater than 0.

The third determining submodule 101 includes a dividing unit 131 and a third allocating unit 132.

The dividing unit 131 is configured to divide the first number of designated time units into the fifth number of time unit groups.

The third allocating unit 132 is configured to, calculate a time interval between each time unit in each time unit group and the first DCI signaling, allocate default beam indication information to a time unit whose time interval is less than a preset threshold; and allocate one of the fifth number of pieces of beam indication information to a time unit whose time interval is greater than or equal to the threshold, in which different time unit groups are allocated with different pieces of beam indication information in the fifth number of pieces of beam indication information, and the time unit group includes consecutive time units and/or nonconsecutive time units.

Figure 14:
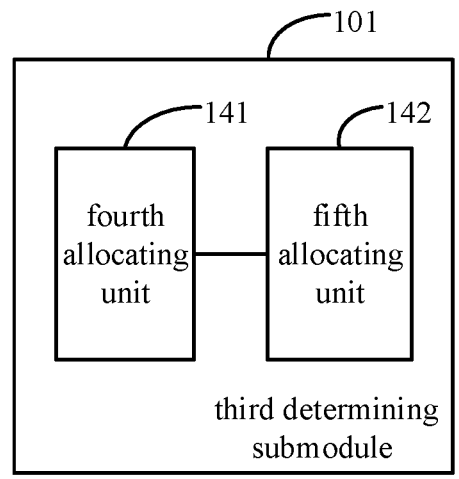
FIG. 14 is a block diagram illustrating another apparatus for indicating transmission, according to an exemplary embodiment.

In some embodiments, based on the apparatus in FIG. 10, as illustrated in FIG. 14, a number of pieces of beam indication information to be allocated is a sixth number, the sixth number is less than the first number, and the sixth number is an integer greater than 0.

The third determining submodule 101 includes a fourth allocating unit 141 and a fifth allocating unit 142.

The fourth allocating unit 141 is configured to, calculate a time interval between each designated time unit and the first DCI signaling, and allocate default beam indication information to a time unit whose time interval is less than a preset threshold.

The fifth allocating unit 142 is configured to, divide time units whose time intervals are greater than or equal to the threshold into the sixth number of time unit groups, and allocate one of the sixth number of pieces of beam indication information to each of the sixth number of time unit groups, in which different time unit groups are allocated with different pieces of beam indication information in the sixth number of pieces of beam indication information, and the time unit group includes consecutive time units and/or nonconsecutive time units.

In some embodiments, based on any of the apparatuses in FIG. 11 to FIG. 14, the beam indication information to be allocated includes a transmission configuration indication (TCI) state for indicating beam information used when the terminal receives data; and/or spatial relation info for indicating beam information used when the terminal transmits data.

In some embodiments, based on any of the apparatuses in FIG. 12 to FIG. 14, the default beam indication information includes a default TCI state and/or default spatial relation information.

In some embodiments, the default TCI state is the same as a TCI state used when receiving the first DCI signaling; or the default TCI state is the same as a TCI state used when receiving a control-resource set (CORESET) with a smallest index, and the CORESET and the first DCI signaling come from the same antenna panel. In some embodiments, the default spatial relation info is the same as spatial relation info used when transmitting a latest physical uplink control channel (PUCCH), and an antenna panel used when transmitting the PUCCH is the same as an antenna panel used when transmitting uplink data.

Figure 15:
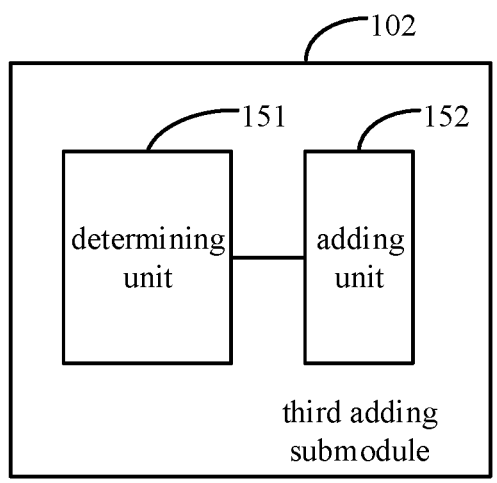
FIG. 15 is a block diagram illustrating another apparatus for indicating transmission, according to an exemplary embodiment.

In some embodiments, based on the apparatus in FIG. 10, as illustrated in FIG. 15, the third adding submodule 102 includes a determining unit 151 and an adding unit 152.

The determining unit 151 is configured to determine antenna panel identifiers corresponding to the designated time units.

The adding unit 152 is configured to add the beam indication information and the antenna panel identifiers into the first DCI signaling.

It may be seen from the above embodiments that the beam indication information and/or antenna panel identifiers corresponding to the designated time units may be determined. The beam indication information and/or antenna panel identifiers may be added into the first DCI signaling. Therefore, it is convenient for the terminal to receive/transmit the TBs based on the beam indication information and/or antenna panel identifiers in the DCI signaling, thereby improving the reliability of the terminal using the beam when receiving/transmitting the TBs.

Figure 16:
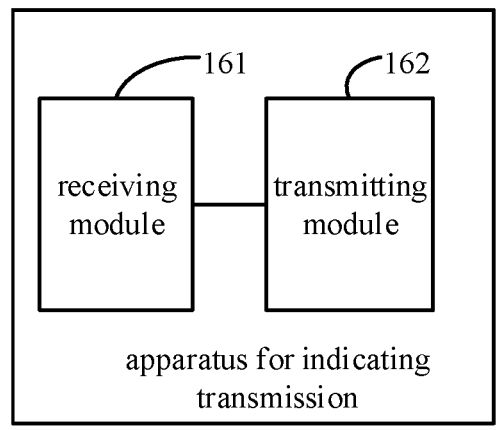
FIG. 16 is a block diagram illustrating another apparatus for indicating transmission, according to an exemplary embodiment.

FIG. 16 is a block diagram illustrating an apparatus for indicating transmission, according to an exemplary embodiment. The apparatus for indicating transmission may be applicable to a terminal. The apparatus for indicating transmission is configured to perform the method for indicating transmission in FIG. 6. As illustrated in FIG. 16, the apparatus for indicating transmission includes a receiving module 161 and a transmitting module 162.

The receiving module 161 is configured to receive a first downlink control information (DCI) signaling from a base station, where the first DCI signaling is configured to indicate that one or more transmission blocks (TBs) are transmitted/received in a first number of designated time units, and the first number is an integer greater than 1.

The transmitting module 162 is configured to receive/transmit the TBs in the designated time units based on the first DCI signaling.

Figure 17:
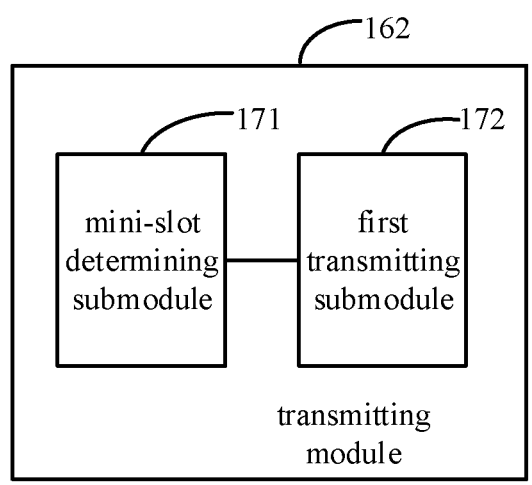
FIG. 17 is a block diagram illustrating another apparatus for indicating transmission, according to an exemplary embodiment.

In some embodiments, based on the apparatus in FIG. 16, as illustrated in FIG. 17, the designated time unit is a designated mini-slot; and the first DCI signaling includes a position of start symbol and a number of symbols, of each designated mini-slot. The transmitting module 162 includes a mini-slot determining submodule 171 and a first transmitting submodule 172.

The mini-slot determining submodule 171 is configured to determine the position of start symbol and the number of symbols, of the each designated mini-slot, based on the first DCI signaling.

The first transmitting submodule 172 is configured to receive/transmit/the TBs based on the position of start symbol and the number of symbols, of the each designated mini-slot.

Figure 18:
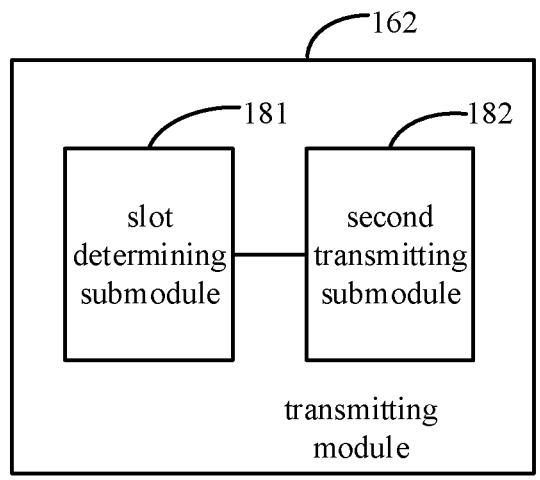
FIG. 18 is a block diagram illustrating another apparatus for indicating transmission, according to an exemplary embodiment.

In some embodiments, based on the apparatus in FIG. 16, as illustrated in FIG. 18, the designated time unit is a designated slot; and the first DCI signaling includes a position of a designated start symbol and a position of a designated end symbol, of each designated slot. The transmitting module 162 includes a slot determining submodule 181 and a second transmitting submodule 182.

The slot determining submodule 181 is configured to determine the position of the designated start symbol and the position of the designated end symbol, for receiving/transmitting the TBs, based on the first DCI signaling.

The second transmitting submodule 182 is configured to receive/transmit the TBs based on the position of the designated start symbol and the position of the designated end symbol.

Figure 19:
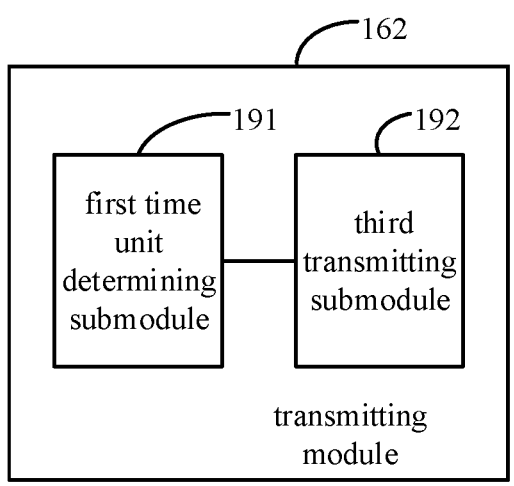
FIG. 19 is a block diagram illustrating another apparatus for indicating transmission, according to an exemplary embodiment.

In some embodiments, based on the apparatus in FIG. 16, as illustrated in FIG. 19, the first DCI signaling includes beam indication information corresponding to the designated time units. The transmitting module 162 includes a first time unit determining submodule 191 and a third transmitting submodule 192.

The first time unit determining submodule 191 is configured to determine the beam indication information corresponding to the designated time units based on the first DCI signaling.

The third transmitting submodule 192 is configured to receive/transmit the TBs based on the beam indication information.

Figure 20:
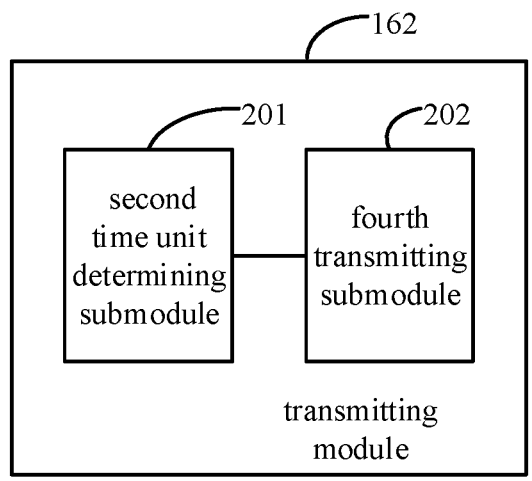
FIG. 20 is a block diagram illustrating another apparatus for indicating transmission, according to an exemplary embodiment.

In some embodiments, based on the apparatus in FIG. 16, as illustrated in FIG. 20, the first DCI signaling includes beam indication information and antenna panel identifiers, corresponding to the designated time units. The transmitting module 162 includes a second time unit determining submodule 201 and a fourth transmitting submodule 202.

The second time unit determining submodule 201 is configured to determine the beam indication information and antenna panel identifiers, corresponding to the designated time units, based on the first DCI signaling.

The fourth transmitting submodule 202 is configured to receive/transmit the TBs based on the beam indication information and antenna panel identifiers.

In some embodiments, based on the apparatus in FIG. 19 and FIG. 20, the beam indication information includes a transmission configuration indication (TCI) state for indicating beam information used when the terminal receives data; and/or spatial relation info for indicating beam information used when the terminal transmits data.

With respect to the apparatus embodiments, since they basically correspond to the method embodiments, relevant parts of the apparatus embodiments may refer to parts of the description of the method embodiments. The apparatus embodiments described above are merely illustrative. The units described above as separate components may or may not be physically separated, and the components displayed as units may or may not be physical units, that is, they may be located in one place or distributed to multiple network units. Some or all of the modules may be selected based on actual needs to achieve the objectives of the solutions of the disclosure. Those of ordinary skill in the art may understand and implement it without creative work.

The disclosure also provides a non-transitory computer-readable storage medium. The storage medium has stored therein computer programs that are configured to perform the method described in any one of FIGS. 1 to 5.

The disclosure also provides a non-transitory computer-readable storage medium. The storage medium has stored therein computer programs that are configured to perform the method described in FIG. 6.

The disclosure also provides a device for indicating transmission. The device is applicable to a base station.

The device includes a processor and a memory for storing instructions executable by the processor.

The processor is configured to perform the following.

It is determined to transmit/receive one or more transmission blocks (TBs) in a first number of designated time units, where the first number is an integer greater than 1.

A first downlink control information (DCI) signaling for indicating that the one or more TBs are transmitted/received in the designated time units, is generated.

The first DCI signaling is transmitted to a terminal, so that the terminal receives/transmits the one or more TBs in the designated time units based on the first DCI signaling.

Figure 21:
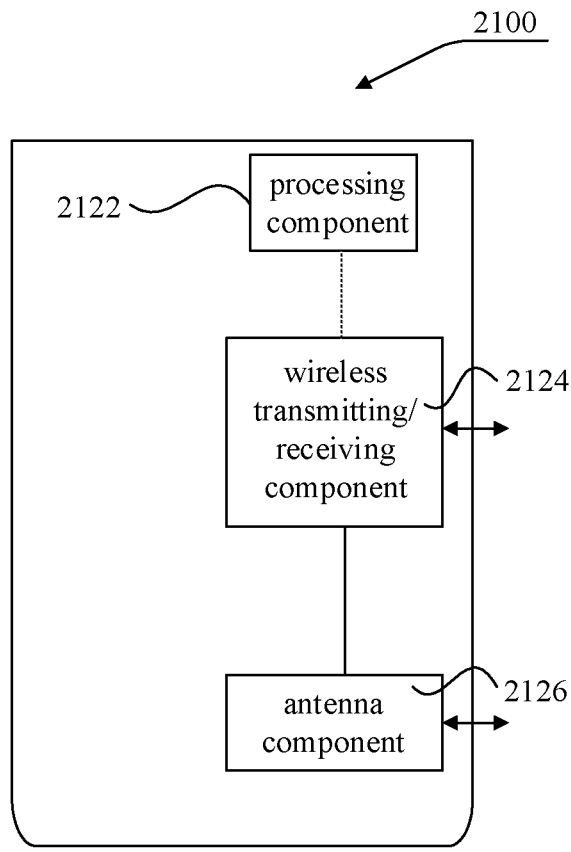
FIG. 21 is a block diagram illustrating a device for indicating transmission, according to an exemplary embodiment.

As illustrated in FIG. 21, FIG. 21 is a block diagram illustrating a device for indicating transmission, according to an exemplary embodiment. The device 2100 may be provided as a base station. With reference to FIG. 21, the device 2100 may include a processing component 2122, a wireless transmitting/receiving component 2124, an antenna component 2126, and a signal processing part specific to a wireless interface. The processing component 2122 may further include one or more processors.

One of the processors in the processing component 2122 may be configured to execute any of the foregoing methods for indicating transmission.

The disclosure also provides a device for indicating transmission. The device is applicable to a terminal.

The device includes a processor and a memory for storing instructions executable by the processor.

The processor is configured to perform the following.

A first downlink control information (DCI) signaling is received from a base station, where the first DCI signaling is configured to indicate that one or more transmission blocks (TBs) are transmit/received in a first number of designated time units, and the first number is an integer greater than 1.

The TBs are received/transmit in the designated time units based on the first DCI signaling.

Figure 22:
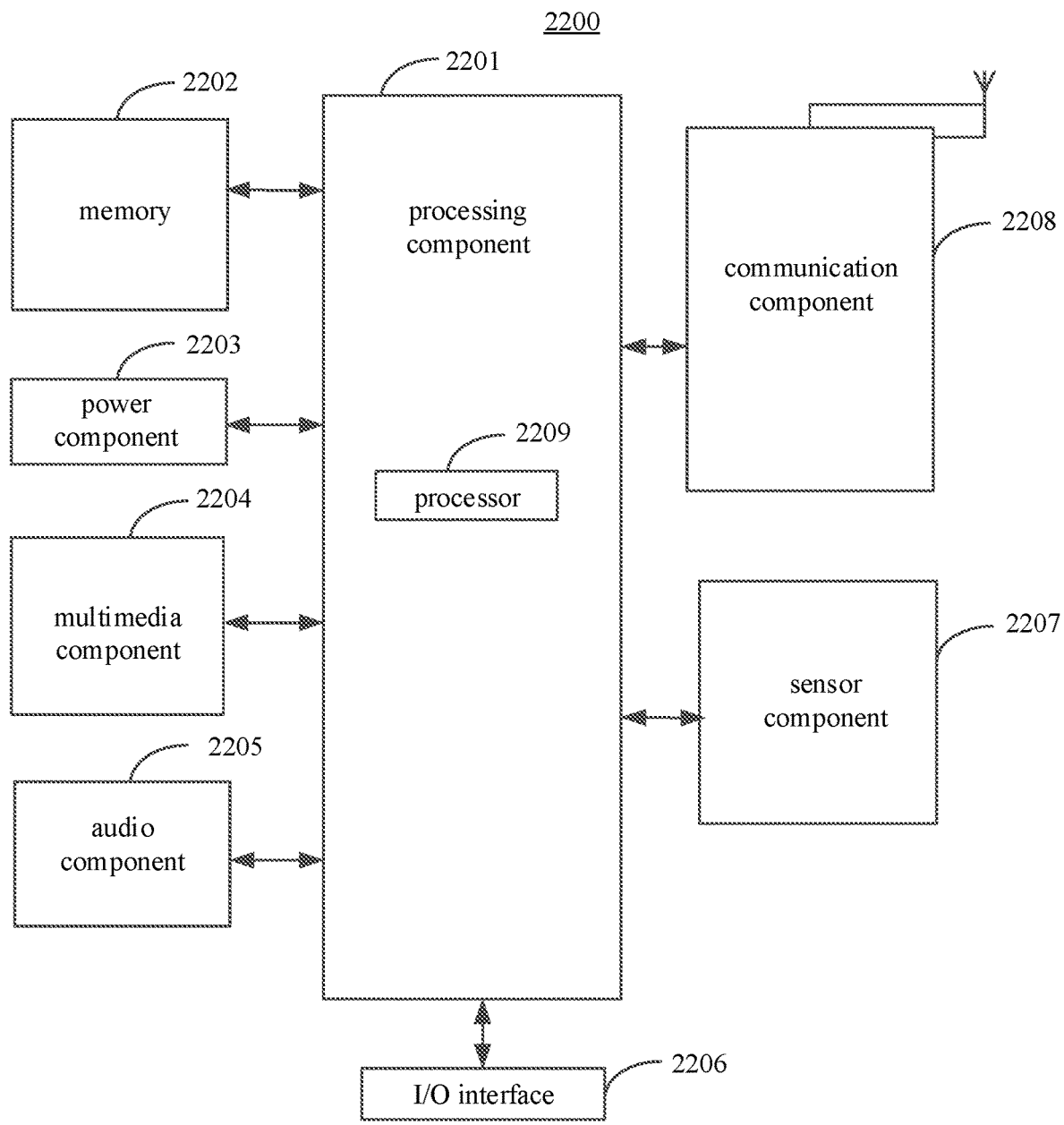
FIG. 22 is a block diagram illustrating a device for indicating transmission, according to an exemplary embodiment.

FIG. 22 is a block diagram illustrating a device for indicating transmission, according to an exemplary embodiment. As illustrated in FIG. 22, a device 2200 for indicating transmission according to an exemplary embodiment may be illustrated. The device 2200 may be a computer, a mobile phone, a digital broadcast terminal, a messaging device, a gaming console, a tablet, a medical device, exercise equipment, a personal digital assistant, and the like.

Referring to FIG. 22, the device 2200 may include one or more of the following components: a processing component 2201, a memory 2202, a power component 2203, a multimedia component 2204, an audio component 2205, an input/output (I/O) interface 2206, a sensor component 2207, and a communication component 2208.

The processing component 2201 typically controls overall operations of the device 2200, such as the operations associated with display, telephone calls, data communications, camera operations, and recording operations. The processing component 2201 may include one or more processors 2209 to execute instructions to perform all or part of the actions in the above described methods. Moreover, the processing component 2201 may include one or more modules which facilitate the interaction between the processing component 2201 and other components. For instance, the processing component 2201 may include a multimedia module to facilitate the interaction between the multimedia component 2204 and the processing component 2201.

The memory 2202 is configured to store various types of data to support the operation of the device 2200. Examples of such data include instructions for any applications or methods operated on the device 2200, contact data, phonebook data, messages, pictures, video, etc. The memory 2202 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2206 provides power to various components of the device 2200. The power component 2206 may include a power management system, one or more power sources, and any other components associated with the generation, management, and distribution of power in the device 2200.

The multimedia component 2204 includes a screen providing an output interface between the device 2200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2204 includes a front camera and/or a rear camera. The front camera and the rear camera may receive an external multimedia datum while the device 2200 is in an operation mode, such as a photographing mode or a video mode. Each of the front camera and the rear camera may be a fixed optical lens system or have focus and optical zoom capability.

The audio component 2205 is configured to output and/or input audio signals. For example, the audio component 2205 includes a microphone ("MIC") configured to receive an external audio signal when the device 2200 is in an operation mode, such as a call mode, a recording mode, and a voice recognition mode. The received audio signal may be further stored in the memory 2202 or transmitted via the communication component 2208. In some embodiments, the audio component 2205 further includes a speaker to output audio signals.

The I/O interface 2206 provides an interface between the processing component 2201 and peripheral interface modules, such as a keyboard, a click wheel, buttons, and the like. The buttons may include, but are not limited to, a home button, a volume button, a starting button, and a locking button.

The sensor component 2207 includes one or more sensors to provide status assessments of various aspects of the device 2200. For instance, the sensor component 2207 may detect an open/closed status of the device 2200, relative positioning of components, e.g., the display and the keypad, of the device 2200, a change in position of the device 2200 or a component of the device 2200, a presence or absence of user contact with the device 2200, an orientation or an acceleration/deceleration of the device 2200, and a change in temperature of the device 2200. The sensor component 2207 may include a proximity sensor configured to detect the presence of nearby objects without any physical contact. The sensor component 814 may also include a light sensor, such as a CMOS or CCD image sensor, for use in imaging applications. In some embodiments, the sensor component 2207 may also include an accelerometer sensor, a gyroscope sensor, a magnetic sensor, a pressure sensor, or a temperature sensor.

The communication component 2208 is configured to facilitate communication, wired or wirelessly, between the device 2200 and other devices. The device 2200 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 2208 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 2209 in the device 2200, for performing the above-described methods. For example, the non-transitory computer-readable storage medium may be a ROM, a RAM, a CD-ROM, a magnetic tape, a floppy disc, an optical data storage device, and the like. When the instructions in the storage medium are performed by the processor, the device 2200 is caused to perform any method described above.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for indicating transmission, for a base station, comprising:
   determining to transmit/receive two or more transmission blocks (TBs) in a first number of designated time units, wherein the first number is an integer greater than 1;
   generating a first downlink control information (DCI) signaling for indicating that the two or more TBs are transmitted/received in the designated time units and further for indicating two or more pieces of beam indication information for the two or more TBs; and
   transmitting the first DCI signaling to a terminal;
   wherein the method comprises:
   allocating first beam indication information to time unit(s) whose time interval is less than a preset threshold, wherein the time interval is between each designated time unit and the first DCI signaling; and
   allocating second beam indication information to time unit(s) whose time interval is greater than or equal to the preset threshold, wherein the time interval is between each designated time unit and the first DCI signaling;
   wherein both the first beam indication information and the second beam indication information are in the first DCI signaling, a number of pieces of beam indication information is less than a number of time units;
   wherein the beam indication information comprises a transmission configuration indication (TCI).

2. The method as claimed in claim 1, wherein the designated time unit is a designated mini-slot; and
   generating the first DCI signaling comprises:
   determining a position of start symbol and a number of symbols of each designated mini-slot; and
   adding the position of start symbol and the number of symbols of each designated mini-slot into the first DCI signaling;
   wherein the designated time unit is a designated slot; and generating the first DCI signaling comprises:
   determining a position of a designated start symbol and a position of a designated end symbol, of each designated slot; and
   adding the position of the designated start symbol and the position of the designated end symbol into the first DCI signaling.

3. The method as claimed in claim 2, wherein a number of slots occupied by the designated mini-slots is a second number, the second number is less than or equal to the first number, the second number is an integer greater than 0, and all symbols of one designated mini-slot are within one slot and cannot be allocated to different slots.

4. The method as claimed in claim 2, wherein the designated mini-slots comprise adjacent mini-slots and/or non-adjacent mini-slots.

5. The method as claimed in claim 1, wherein generating the first DCI signaling comprises:
   determining the two or more pieces of beam indication information for the two or more TBs; and
   adding the two or more pieces of beam indication information into the first DCI signaling.

6. The method as claimed in claim 5, wherein a number of pieces of beam indication information to be allocated is a third number, and the third number is equal to the first number, and
   wherein the method comprises:
   allocating the pieces of beam indication information to the designated time units, respectively, different pieces of beam indication information being allocated to different designated time units.

7. The method as claimed in claim 6, wherein the beam indication information to be allocated comprises a TCI state for indicating beam information used when the terminal receives data; and/or spatial relation info for indicating beam information used when the terminal transmits data.

8. The method as claimed in claim 5, wherein a number of pieces of beam indication information to be allocated is a fourth number, the fourth number is less than the first number, and the fourth number is an integer greater than 0; and
   wherein the method further comprises:
   for the designated time units, allocating the pieces of beam indication information to the fourth number of latter designated time units, respectively, and allocating one piece of default beam indication information to each of other designated time units.

9. The method as claimed in claim 8, wherein the default beam indication information comprises a default TCI state and/or default spatial relation info.

10. The method as claimed in claim 5, wherein a number of pieces of beam indication information to be allocated is a fifth number, the fifth number is less than the first number, and the fifth number is an integer greater than 0; and
    wherein the method further comprises:
    dividing the first number of designated time units into the fifth number of time unit groups;
    calculating a time interval between each time unit in each time unit group and the first DCI signaling, allocating default beam indication information to a time unit whose time interval is less than a preset threshold; and
    allocating one of the fifth number of pieces of beam indication information to a time unit whose time interval is greater than or equal to the threshold, wherein different time unit groups are allocated with different pieces of beam indication information in the fifth number of pieces of beam indication information, and the time unit group comprises consecutive time units and/or nonconsecutive time units.

11. A method for indicating transmission, for a terminal, comprising:
receiving a first downlink control information (DCI) signaling from a base station, where the first DCI signaling is configured to indicate that two or more transmission blocks (TBs) are transmitted/received in a first number of designated time units and further indicate two or more pieces of beam indication information for the two or more TBs, and the first number is an integer greater than 1; and
receiving/transmitting the TBs in the designated time units based on the first DCI signaling;
wherein the method comprises:
allocating first beam indication information to time unit(s) whose time interval is less than a preset threshold, wherein the time interval is between each designated time unit and the first DCI signaling; and
allocating second beam indication information to time unit(s) whose time interval is greater than or equal to the preset threshold, wherein the time interval is between each designated time unit and the first DCI signaling;
wherein both the first beam indication information and the second beam indication information are in the first DCI signaling, a number of pieces of beam indication information is less than a number of time units;
wherein the beam indication information comprises a transmission configuration indication (TCI).

12. The method as claimed in claim 11, wherein the designated time unit is a designated mini-slot; and the first DCI signaling comprises a position of start symbol and a number of symbols, of each designated mini-slot; and
receiving/transmitting the TBs in the designated time units based on the first DCI signaling comprises:
determining the position of start symbol and the number of symbols, of the each designated mini-slot, based on the first DCI signaling; and
receiving/transmitting the TBs based on the position of start symbol and the number of symbols, of the each designated mini-slot.

13. The method as claimed in claim 11, wherein the designated time unit is a designated slot; and the first DCI signaling comprises a position of a designated start symbol and a position of a designated end symbol, of each designated slot; and
receiving/transmitting the TBs in the designated time units based on the first DCI signaling comprises:
determining the position of the designated start symbol and the position of the designated end symbol, of the each designated slot, based on the first DCI signaling; and
receiving/transmitting the TBs based on the position of the designated start symbol and the position of the designated end symbol.

14. The method as claimed in claim 11, wherein receiving/transmitting the TBs in the designated time units based on the first DCI signaling comprises:
determining the beam indication information corresponding to the designated time units based on the first DCI signaling; and
receiving/transmitting the TBs based on the beam indication information.

15. The method as claimed in claim 14, wherein the beam indication information comprises a transmission configuration indication (TCI) state for indicating beam information used when the terminal receives data; and/or spatial relation info for indicating beam information used when the terminal transmits data.

16. The method as claimed in claim 11, wherein the first DCI signaling comprises antenna panel identifiers, corresponding to the designated time units; and
receiving/transmitting the TBs in the designated time units based on the first DCI signaling comprises:
determining the beam indication information and antenna panel identifiers, corresponding to the designated time units, based on the first DCI signaling; and
receiving/transmitting the TBs based on the beam indication information and antenna panel identifiers.

17. A device for indicating transmission, for a terminal, comprising:
a processor; and
a memory for storing instructions executable by the processor;
wherein the processor is configured to perform the method as claimed in claim 11.

18. A device for indicating transmission, for a base station, comprising:
a processor; and
a memory for storing instructions executable by the processor;
wherein the processor is configured to:
determine to transmit/receive one or more transmission blocks (TBs) in a first number of designated time units, where the first number is an integer greater than 1;
generate a first downlink control information (DCI) signaling for indicating that the one or more TBs are received/transmitted in the designated time units and further for indicating beam indication information corresponding to each designated time unit; and
transmit the first DCI signaling to a terminal;
wherein the processor is configured to:
allocate first beam indication information to time unit(s) whose time interval is less than a preset threshold, wherein the time interval is between each designated time unit and the first DCI signaling; and
allocate second beam indication information to time unit(s) whose time interval is greater than or equal to the preset threshold, wherein the time interval is between each designated time unit and the first DCI signaling;
wherein both the first beam indication information and the second beam indication information are in the first DCI signaling, a number of pieces of beam indication information is less than a number of time units;
wherein the beam indication information comprises a transmission configuration indication (TCI).

* * * * *